April 19, 1960 A. F. GRANT 2,933,170
MAGNETIC FLUID CLUTCH WITH MAGNETIC PARTICLE SEAL
Filed June 26, 1956 2 Sheets-Sheet 1

Inventor
Arthur F. Grant
By
J. C. Thorpe
Attorney

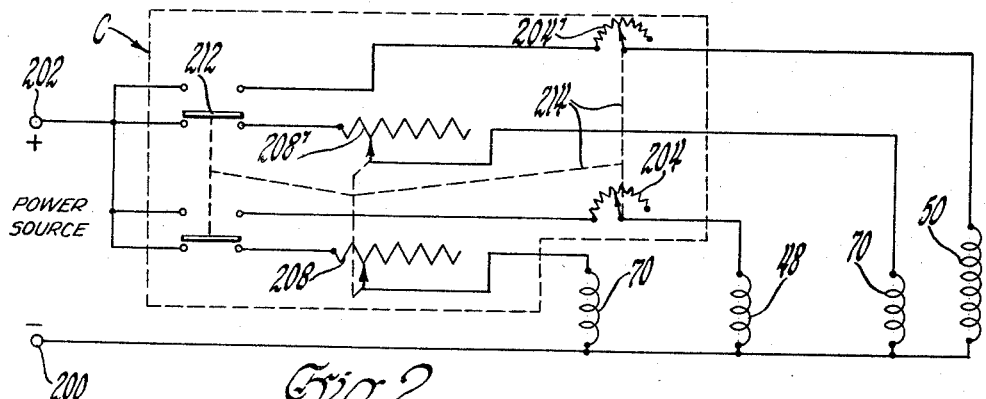
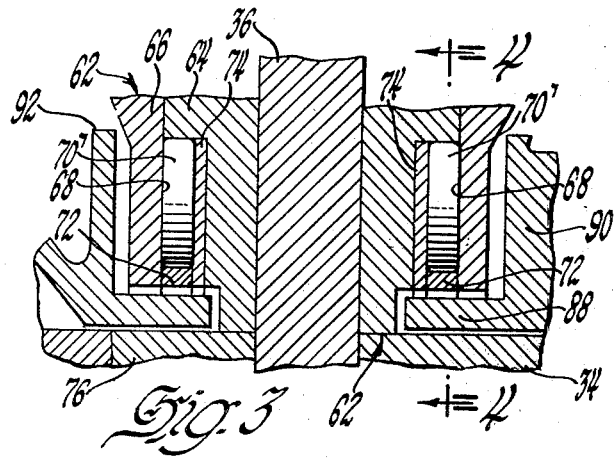
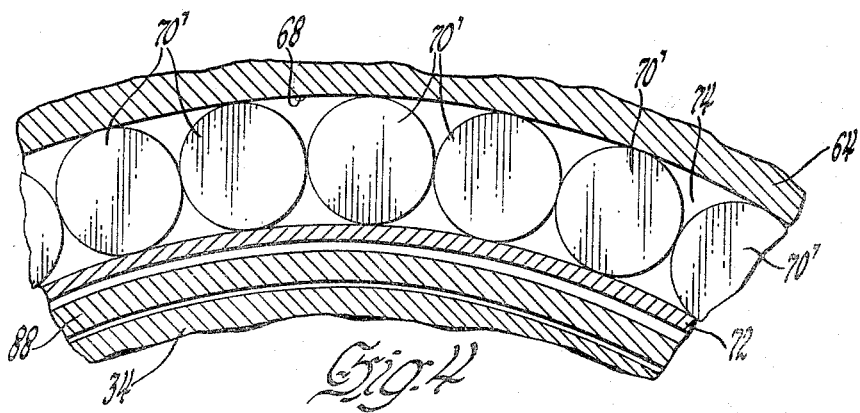

United States Patent Office 2,933,170
Patented Apr. 19, 1960

2,933,170

MAGNETIC FLUID CLUTCH WITH MAGNETIC PARTICLE SEAL

Arthur F. Grant, Cleveland, Ohio, assignor to General Motors Corporation, Detroit, Mich., a corporation of Delaware Application June 26, 1956, Serial No. 593,887

15 Claims. (Cl. 192—21.5)

This invention relates to a magnetic seal and, more particularly, to a magnetic seal for a magnetic coupling of the type employing a quantity of magnetic particles which, under the influence of a magnetic field, acts to transmit force between two otherwise independently movable and relatively spaced members.

Magnetic coupling devices of this type are well known and include clutches and brakes generally formed from a pair of relatively rotatable magnetic members defining an annular gap therebetween and including means for establishing a controllable magnetic field bridging the gap between the members which effects a torque transmitting bond between the magnetic members and the discrete magnetic particles. The magnetic particles utilized in such coupling devices may be either in their dry powder form or mixed with either dry or wet lubricants, but wet or dry, the magnetic particle mixture is preferably limited in volumetric quantity to an amount slightly less than, equal to, or slightly more than the volume of magnetic gap between the members. By thus limiting the quantity of particles, frictional drag is reduced or eliminated between the members and particles when the coupling is deenergized. In addition to the power loss represented by such frictional loss, the use of an excessive quantity of such particles would also result in destructive abrading of the coupling members and particles and in extreme cases might even result in clutch seizures.

Since the magnetic particles utilized in such couplings are capable of acting as a fine abrasive powder, a principal objection to the use of such couplings has been the lack of a seal completely effective to retain the magnetic particles within the coupling. Where conventional shaft seals have been utilized, the abrasive nature of the particles has resulted in relatively short seal life. Labyrinth type and magnetic type seals have been utilized alone, and in combination, with some success but have not proven to be entirely satisfactory for all applications; particularly in those applications where the coupling is deenergized for substantial periods of time, the relative rotation between the coupling member resulting in turbulence within the coupling. This condition is particularly aggravated in two-way reversing couplings where the elements of the deenergized coupling are rotatably driven in opposite directions. The failure of such seals to retain the particles within the coupling, permits the escaping particles to contaminate the lubricant and to effect the abrasive wear of the seals and bearing surfaces of the coupling and associated machinery.

The invention contemplates among its principal objects to provide a magnetic particle sealing device of an improved design; to provide such a seal with elements of coacting configurations effecting an improved magnetic sealing action therebetween; to provide such a seal with a multiple stage magnetic labyrinth type sealing action, and to provide such a seal with a plurality of elements cooperating in assembly to facilitate the manufacture, inspection and maintenance of this seal.

Further and more specific objects of the invention are to provide such a seal with means for establishing a controllable magnetic field whereby the sealing action is controlled in accordance with the operation of the magnetic particle coupling; and to provide such a seal with means for establishing a magnetic sealing action when the associated coupling is deenergized, and for reducing the magnetic sealing action when the associated coupling is energized.

A still further and more specific object of the invention is to provide a magnetic seal of an improved design particularly adapted for use in a magnetic particle coupling constructed in accordance with the disclosure of United States patent application Serial No. 593,965, filed June 26, 1956, in the names of William E. Brill and Arthur F. Grant, and entitled, "Magnetic Particle Coupling."

The foregoing and other objects, features and advantages of the invention will be more thoroughly understood from the following description having reference to the accompanying drawings showing several preferred embodiments thereof, in which:

Figure 2 is a schematic diagram of a control system for the magnetic particle coupling shown in Figure 1;

Figure 3 is a sectional view of a portion of a magnetic particle coupling similar to that shown in Figure 1 and illustrates a second form of the invention; and Figure 4 is a sectional view of the form of the invention of Figure 3 and is taken substantially on the line 4—4 of Figure 3.

Figure 1:
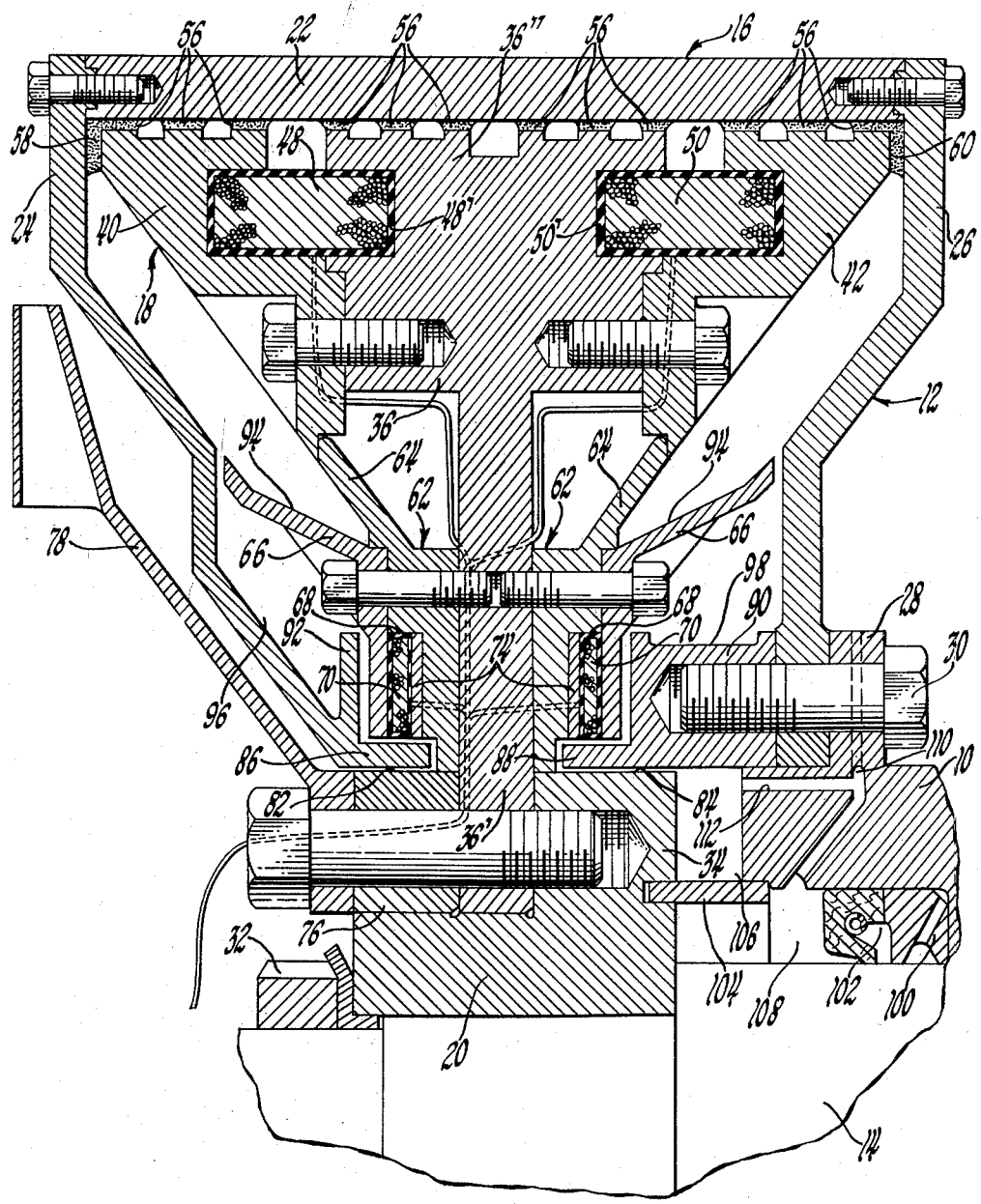
Figure 1 is a sectional view of a portion of a magnetic particle coupling embodying one form of the invention.

Referring now more particularly to Figure 1, a hollow shaft, the end of which is shown at 10, is adapted to be rotatably mounted in a supporting structure, not shown, and journals a second shaft 14, the end of which projects beyond the end of the shaft 10. A magnetic particle coupling 12, of a construction such as is shown and described in the above-identified patent application, is adapted to drivingly interconnect the ends of the shafts 10 and 14 and includes an inductor drum assembly 16 which is secured to the end of the shaft 10 and spacedly embraces an armature or electromagnetic field pole assembly 18 which is secured to a hub 20 mounted on the end of the shaft 14.

The inductor drum assembly 16 includes a cylindrical member 22 of magnetic material which concentrically embraces the outer peripheral surface portions of the field pole assembly 18. The opposite ends of the cylindrical member 18 are secured to two end plates 24 and 26 adjacent their outer peripheries. The end plates 24 and 26 are of stepped configuration extending radially and axially inwardly of the coupling. The plate 26 is secured adjacent its inner periphery to a flange 28 carried by the outer end of the hollow shaft 10 by a plurality of bolts 30. The two end plates 24 and 26 are preferably of magnetic material.

The armature or electromagnetic field pole assembly 18 of the coupling includes the hub 20 which is preferably of magnetic material. The hub 20 is non-rotatably secured to the end of the shaft 14 and retained thereon by a locked spanner nut, as shown at 32. The hub is of stepped outer diameter to provide a radially-extending shoulder or flange 34 for mounting a web or spider portion 36' of a central intermediate pole member 36. The central pole member is symmetrical about a plane normal to the axis of the shaft 14 and has an outer pole portion 36" which serves as a mounting structure for the remainder of the armature assembly. Two annular pole members 40 and 42 are secured to the opposite end faces of the pole portion 36" of the member 36.

The adjacent faces of the several pole members are recessed to define two annular pockets 48' and 50' and to axially separate the outer peripheral portions of the pole members. Two oppositely-wound annular field coil windings 48 and 50 are mounted in the annular pockets 48' and 50' and are electrically energizable to establish two substantially toroidal magnetic fields bridging the annular space between the inductor drum and armature assemblies. These magnetic fields establish the annular pole members 40 and 42 as magnetic poles of the same polarity, and establish the intermediate pole member 36 as a magnetic pole of the opposite polarity.

The outer surface portions of the pole members 36, 40 and 42 are of stepped or grooved configuration to define a plurality of cylindrical magnetic air gaps 56 extending radially between the inductor drum member 22 and the several pole members. The outwardly disposed ends of the pole members 40 and 42 also define two secondary magnetic air gaps 58 and 60 of limited radial dimension extending axially between the pole members 40, 42 and the end plates 24 and 26, respectively, of the inductor drum.

A mixture of magnetic particles is interposed between the inductor drum and armature assemblies. Preferably, this mixture is of a dry particle type, with or without dry lubricant, but may be of a slurry-type having magnetic particles mixed with a prescribed percentage of liquid lubricant. The magnetic particles are of a size conventional for such couplings and are preferably limited to an amount equal to or slightly in excess of the amount required to fill the air gaps between the assemblies.

Elements of two identical magnetic seal assemblies 62 are mounted on opposite sides of the web portion 36' of the intermediate pole member 36 and coact with the inner peripheral portions of the end plates 24 and 26 to prevent the passage of magnetic particles from the chamber defined between the inductor drum and armature assemblies. The elements of each of the magnetic seal assemblies 62 are interchangeable, being reversible end for end.

Each of the magnetic seal assemblies 62 includes two non-magnetic members 64 and 66 which define an annular groove or pocket 68 therebetween opening inwardly of the coupling. In the embodiment of Figure 1, each of the pockets 68 mounts an annular field coil winding 70 and an annular pole piece 74 of magnetic material which is mounted between the housing member 64 and the field coil 70. The members 64, 66, the field coil 70 and the pole piece 74 have inner peripheral surfaces which are in axially-aligned and spaced concentric relation either to an adjacent ring 76 of magnetic material secured to the web 36' or to the outer surface of the flange 34 formed on the hub member 20. This construction forms two oppositely-disposed annular grooves 82 and 84 opening towards the axial ends of the coupling. The ring 76 serves as a spacer between the web 36' and a radial fan 78 which, in conjunction with a stationary shield or housing, not shown, is adapted upon rotation of the armature assembly to deliver cooling air over the inductor drum assembly.

A cylindrical sleeve portion 86 is formed on the end plate 24 and projects into the groove 82 in concentric spaced relation to the side walls thereof, and a cylindrical sleeve portion 88 of an annular sealing member 90 secured to the end plate 26 by the bolts 30 similarly projects into the groove 84. The end plate 24 is also provided with a flange 92 extending radially outwardly of the cylindrical portion 86. The flange 92 has an annular surface thereon which is normal to the cylindrical portion 86 and parallel to an annular surface on the adjacent member 66. The annular member 90 also has an annular surface thereon which is normal to the cylindrical portion 88 and parallel to an annular surface of the adjacent member 66.

In addition to their functions directly related to the magnetic seals 62, the members 64, 66, 90, and the flange 92 of the end plate 24 are also arranged to provide a series of annular baffles or labyrinth pockets tending to prevent magnetic particles from passing radially inwardly of the coupling towards the magnetic seals. The outer peripheral portion of each of the members 64 mates with the annular pole member 40 or 42 and serves as a closure preventing magnetic particles from being centrifuged into and trapped within the annular spaces defined by the web 36' and the poles 36", 40 and 42. The outer portion of each member 64 also cooperates with an annular baffle formed by the outer portion of the adjacent member 66 to provide annular particle collecting pockets 94 tending to prevent magnetic particles from passing radially inwardly of the coupling towards the magnetic seals. The flange 92 and the member 90 also serve to form similar annular particle collecting pockets 96 and 98, respectively.

The field coil windings 70 are electrically energizable to establish substantially toroidal magnetic fields bridging the air gaps between the pole piece 74 of each seal and the adjacent cylindrical portions 86 or 88 and between the members 66 and the radially-extending surface of the adjacent flange 92 or of the member 90. In accordance with the invention, the establishment of these magnetic fields provides a three stage magnetic labyrinth effective to prevent the loss of magnetic particles from the coupling.

Since a substantial number of the magnetic lines of force generated by the flow of electricity in each of the field coils 70 are concentrated in the adjacent pole pieces 74 and thus in the radial magnetic gap between the pole piece and the adjacent cylindrical portions 86 or 88, the flux density across these gaps is relatively high. However, the lines of force passing between the members 66 and the flange 92 or the member 90 act through a much greater area and through a substantially greater effective magnetic gap including the adjacent non-magnetic member 66 as well as the intermediate air gap. Consequently, the magnetic fields across the air gaps between these members are of a relatively low flux density.

By this arrangement of the air gaps between the several elements of the magnetic seals, any magnetic particles tending to pass radially inwardly of the coupling are first decelerated by the relatively weak magnetic field in the air gap between the member 66 and the adjacent flange 92 or member 90 and then attracted to the surface of the member 66 from which they are centrifuged radially outwardly by the rotation of the armature assembly 18. Any particles moving beyond this first stage sealing action are first required to move axially of the sealing elements and are then subjected to a second stage of magnetic sealing action provided by the pole piece 74 which tends to maintain a particle sealing annulus of magnetic particles in the gap between the piece 74 and the adjacent sleeve portion 86 or 88. Should any particles pass beyond this second stage of magnetic sealing action, they are required to reverse their direction first radially and then axially of the coupling before they can pass outwardly of the coupling between the concentrically spaced surfaces of the sleeves 86 or 88 and of the ring 76 or hub 20, respectively. However, in passing between these surfaces these particles are subjected to a third stage of magnetic sealing action provided by leakage and residual flux between the sleeve portion 86 and the ring 76, or between the sleeve portion 88 and the hub 20.

The first and second stage sealing actions will normally be sufficient to maintain the particles within the coupling; the third stage being provided merely as assurance against any particle leakage. It is contemplated that in certain applications the sleeve portions 86 and 88, the adjacent surfaces of the seals 62, the ring 76 and the hub 20 may be provided with spiral grooves, none shown, whereby relative rotation between the inductor and armature assemblies causes the magnetic particles passing into the sealing spaces between these members to be returned within the coupling by these grooves.

Suitable oil seals are provided to seal the lubricant supplied to the bearings for the shaft members 10 and 14 from the magnetic particle coupling. Two of these seals 100 and 102 are shown interposed radially between the shafts 10 and 14. A third sealing member 104 in the form of a short sleeve is carried at one end by the hollow shaft 10, the opposite end riding in an annular groove formed in the hub member 20. The sealing ring 104 divides the annular space intermediate the sealing member 90 and the oil seal 102 into two chambers 106 and 108. The two chambers are preferably vented to atmosphere; the chamber 106 being vented by one or more passages 110 extending substantially radially through the hollow shaft 110; and the chamber 108 being connected to the passage 110 by a passage 112 extending axially of the shaft member 10. By this arrangement, should any oil or particles enter the chambers 106 and 108, respectively, it will be centrifuged radially outwardly through the passage 110, thus preventing oil from contaminating the magnetic particle mixture of the coupling and preventing magnetic particles from reaching the oil seal 102 which would result in the rapid destruction of such a seal.

As shown schematically in Figure 2, the field coil windings 48 and 50 of the armature 18 and the windings 70, 70 of the seals 62 are selectively connectable in parallel to the terminals 200 and 202 of an electrical power supply through suitable leads, a slip ring and brush contact assembly, not shown, and a controller C including field control rheostats 204, 204' and 208, 208' and a multiple throw switch 212. When the switch 212 is in the position shown, the armature field coils 48 and 50 are deenergized and the field coils 70, 70 of the magnetic seals are in parallel with the power source, with the rheostats 208, 208' controlling the field inducing flow of current therethrough. As explained above, the fields established by the coils 70, 70 are effective to seal the coupling from the loss of magnetic particles.

The armature field coils 48 and 50 are energized by moving the switch 212 to its upper position. This movement of the switch simultaneously deenergizes the field coils 70, 70. The energization of the armature field coils 48 and 50 establishes magnetic fields bridging the air gaps 56, 58 and 60 between the pole members and the inductor drum assembly and effecting a load transmitting bond therebetween through the magnetic particles. This bonding action is proportional to the electrical excitation of the field coils 48 and 50 as controlled by the rheostats 204, 204' up to a point at which the field-inducing current passing through the coils is sufficient to effectively lock the inductor drum and armature assemblies together by the magnetic bonding action of the magnetic particles.

It is contemplated that the rheostats 204, 204', 208, 208', and the switch 212 may be interconnected as indicated by the broken lines at 214 to provide the desired operational interrelationship between these elements of the controller. It is also contemplated that the switch 212 may be of a construction operable between an "off" position and an "on" position in which the four field coil windings would be placed in parallel across the power source, the rheostats 204, 204' and 208, 208' being operationally interrelated so that increasing the field current through the armature field coils 48 and 50 would result in a corresponding reduction in the current flowing through the field coils 70, 70 and vice versa.

In the form of the invention shown in Figures 3 and 4, a plurality of disks 70' of permanently magnetic material are mounted in the annular groove or pocket 68 formed between members 64 and 66 in place of the field coil winding 70 utilized in the embodiment of Figure 1. Each of the disks 70' is magnetized axially so that the end faces thereof form poles of opposite polarity. A nonmagnetic retaining ring 72 is mounted in each of the pockets 68 inwardly of the magnetic disks 70'. With this arrangement, the magnetic lines of force emanating from the magnetic poles of the disks 70' adjacent each pole piece 74 are concentrated across the radial magnetic gap between the adjacent pole piece and the adjacent cylindrical portions 86 or 88, and the lines of force emanating from the opposite pole of each disk act through the adjacent non-magnetic member 66 as well as through the adjacent air gap. Consequently, the fields across these air gaps are of a relatively high flux density and are of a relatively low flux density, respectively, and provide the same type of sealing action as with the embodiment of Figure 1. However, this sealing action is equally effective at all times due to the use of the permanently magnetic disks.

Either the inductor drum assembly 16 or the field pole armature assembly 18 may constitute the driving input member of the coupling shown in the illustrative embodiments of the invention. It is generally preferable that the outer member of such couplings constitutes the driving input member since the continuous rotation of such member tends to centrifuge the dry or wet particle mixture outwardly against its inner surface thus reducing the particle sealing problems inherent in such couplings. However, it is desirable in certain application that the driving member of the coupling be that member having the larger inertia mass due to the operation characteristics of the prime mover to which the coupling is connected. In such an application it would be preferable that the heavier field pole armature assembly 18 of the illustrative coupling constitute the driving input member. But with this driving relationship, the magnetic particles are free to float about within the coupling when the armature field coils are deenergized, thus presenting a more difficult particle sealing problem. Consequently, the magnetic seals 62 of the illustrative embodiment are secured to the inner armature assembly so that the rotation of the armature will tend to centrifuge the particles collecting of the members 66 outwardly into the coupling proper when the armature is utilizeed as the driving input member. However, in those applications where the outer member of the coupling will be used continuously as the driving input member the magnetic field establishing portions of each seal preferably would be carried by the end plates 24 and 26.

From the foregoing description it will be seen that the several objects of the invention are obtained by the illustrative embodiments, each of which provides an effective magnetic seal of compact and simplified design providing a multi-stage magnetic labyrinth sealing action and having a plurality of relatively simple interchangeable parts.

While only two illustrative embodiments of the invention have been shown and described, it will be appreciated that various minor modifications may be made without departing from the spirit and scope of the invention, as defined in the following claims.

I claim:

1. A magnetic seal for a magnetic particle coupling device including a pair of relatively rotatable members of magnetic material defining an annular gap therebetween and including means for establishing a controllable magnetic field bridging the gap between the members to effect a torque transmitting bond between the magnetic members through a quantity of discrete magnetic particles interposed between the members, said seal comprising, in combination, a housing of non-magnetic material mounted on one of said members, said housing and the other of said members each having an annular surface thereon, said annular surfaces being in spaced parallel relation to each other and normal to the axis of rotation of said members, said housing and said other member each having a cylindrical surface thereon, said cylindrical surfaces being in spaced parallel relation to each other and in concentric relation to the axis of rotation of said members, said housing having an annular groove formed therein opening toward said cylindrical surface of said other member, an annular pole piece of magnetic material mounted in said groove, an annular field coil winding mounted in said groove adjacent the portion of said housing member defining said annular surface of said housing, and means for electrically energizing said field coil winding to establish a substantially toroidal magnetic field bridging the space between said annular surfaces with relatively low flux density and bridging the space between said pole piece and the cylindrical surface of said other member with relatively high flux density.

2. A magnetic seal including a pair of members of magnetic material mounted for relative rotation about a common axis, a non-magnetic housing carried by one of said members, said housing and the other of said members each having a cylindrical surface concentric to the axis of rotation of said members, said cylindrical surfaces being in radially spaced relation to each other, said housing and said other member each having an annular surface thereon normal to the axis of rotation of said members, said annular surfaces being in axially spaced parallel relation to each other, said housing having an annular groove therein opening on said cylindrical surface of said housing, and means including a ring of magnetic material mounted in said groove to establish a magnetic field of relatively high flux density bridging the space between said cylindrical surfaces and a magnetic field of relatively low flux density bridging the space between said annular surfaces.

3. A magnetic seal including two members of magnetic material, at least one of said members being mounted for rotation relative to the other of said members about an axis, a ring of non-magnetic material carried by said one member, said ring having a first annular surface thereon concentric to the axis of rotation of said member, said other member having a first annular surface thereon in spaced parallel relation to the first annular surface of said ring, said ring having a second annular surface thereon normal to the axis of rotation of said members, said other member having a second annular surface thereon in spaced parallel relation to the second annular surface of said ring, and means associated with said ring for establishing a magnetic circuit bridging the spaces between said first and second surfaces, the magnetic field established by said means across the spaces between said first surfaces being of relatively high flux density and the magnetic field established by said means across said second surfaces being of relatively low flux density.

4. A seal to prevent the passage of magnetic particles between two members mounted for relative rotation about a common axis and defining a particle retaining space and a particle free space, one of said members having an annular surface thereon normal to the axis of rotation of said members and having a second surface thereon concentric with the axis of rotation of said members, a non-magnetic housing carried by the other of said members, said housing having an annular groove therein opening toward one of said surfaces of said one member and having surfaces thereon in spaced parallel relation to said surfaces of said one member, an annular element of magnetic material mounted in said groove and means for establishing a magnetic field mounted in said groove intermediate the annular element and the portion of said housing member spaced from the other surface of said one member, the establishment of said magnetic field bridging the space between said annular element and said one surface of said one member with relatively high flux density and bridging the space between the other of said surfaces and said housing with relatively low flux density.

5. A seal to prevent the passage of magnetic particles from a particle containing space to a particle free space between two members of magnetic material, at least one of said members being mounted for rotation relative to the other of said members about an axis, including a ring of non-magnetic material carried by said one member concentrically of said axis, said ring having at least two annular surfaces thereon concentric to the axis of rotation of said member, one of said annular surfaces being radially disposed of the other of said surfaces, said other member having annular surfaces thereon in spaced parallel relation to the annular surfaces of said ring and means for establishing magnetic circuits bridging the spaces between said annular surfaces of said ring and said other member, the magnetic field established by said means between at least two of said spaced parallel surfaces being of relatively high flux density and the magnetic fields established by said means between at least two of the other of said spaced parallel surfaces being of relatively low flux density.

6. A magnetic seal for a magnetic particle coupling device including a pair of relatively rotatable magnetic members defining an annular gap therebetween and including means for establishing a controllable magnetic field bridging the gap between the members to effect a torque transmitting bond through discrete magnetic particles interposed between the members, said seal comprising, in combination, a non-magnetic housing secured to one of said members, said housing and said one member defining an annular groove opening axially of said coupling, the other of said members having a cylindrical portion formed thereon extending into said groove in spaced concentric relation to the side walls thereof and having a surface thereon extending radially outwardly of said cylindrical portion, said housing having a surface thereon in spaced parallel relation to the outwardly extending surface of said other member, said housing having an annular groove therein opening radially inwardly toward said cylindrical portion, an annular field coil winding and a pole piece of magnetic material mounted in said housing groove in side by side relation, said field coil winding being intermediate said pole piece and the portion of said housing intermediate said housing groove and the surface thereof in spaced parallel relation to the surface on said other member, and means for controlling the flow of a field-inducing electrical current through said field coil winding, the flow of such current being adapted to establish a substantially toroidal magnetic field bridging the space between said pole piece and said cylindrical portion with relatively high flux density and bridging the spaces between said surface portions and between said cylindrical portion and the cylindrical side wall of said first mentioned groove opposite said pole piece with relatively low flux density.

7. A magnetic particle seal including a pair of relatively rotatable members of magnetic material, a housing of non-magnetic material secured to one of said members, said housing and said one member defining an annular groove opening axially of said members, said other member having a cylindrical portion formed thereon extending into said groove in spaced concentric relation to the side walls thereof, said housing having an annular groove therein opening toward said cylindrical portion, said housing groove mounting an annular field coil winding and an annular pole piece of magnetic material in side by side relation, and means for electrically energizing said field coil winding to establish a magnetic field bridging the space between said pole piece and said cylindrical portion with relatively high flux density and bridging the space between said cylindrical portion and the cylindrical side wall of said first mentioned groove opposite said pole piece with relatively low flux density.

8. A magnetic seal including a pair of relatively rotatable magnetic members, a ring of non-magnetic material secured to one of said members, said ring and said one member defining an annular groove therebetween opening axially of said members, said other member having a cylindrical portion formed thereon extending into said groove in radially spaced concentric relation to the side walls of said groove and said other member having a surface thereon normal to said cylindrical portion, said ring having a surface thereon in spaced parallel relation to said surface on said other member, and means carried by said ring for establishing a magnetic field bridging the space between said surfaces with relatively low flux density and bridging the radial space between said cylindrical portion and the ring defined cylindrical side wall of said first mentioned groove with relatively high flux density.

9. A magnetic seal for a magnetic particle coupling device including a pair of relatively rotatable magnetic members defining an annular gap therebetween and including means for establishing a controllable magnetic field bridging the gap between the members to effect a torque transmitting bond between the magnetic members and discrete magnetic particles interposed between the members, said seal comprising, in combination, a non-magnetic annular housing secured to one of said members, said housing and said member defining an annular groove therebetween opening axially of said coupling, said other member having a cylindrical portion formed thereon extending into said groove in spaced relation to the side walls thereof and having a surface thereon normal to said cylindrical portion and in spaced parallel relation to a surface of said housing, said housing having an annular groove therein opening toward said cylindrical portion, said groove mounting an annular pole piece of magnetic material and a permanently magnetic ring in side by side relation, said magnetic ring being intermediate said pole piece and the portion of said housing in spaced parallel relation to the said surface of said other member and being magnetized axially of said coupling thereby establishing a substantially toroidal magnetic field bridging the space between said pole piece and said cylindrical portion with relatively high flux density and bridging the space between said surface portions and between said cylindrical portion and the cylindrical side wall of said first mentioned groove opposite said pole piece with relatively low flux density.

10. A magnetic seal adapted to prevent the passage of magnetic particles between two relatively movable members including a non-magnetic housing carried by one of said members and having a plurality of surfaces thereon in spaced parallel relation with surfaces formed on said other member to define a labyrinth seal between members, a pole member of magnetic material carried by said housing in spaced relation to one of said surfaces of said other member, and means for establishing magnetic fields bridging the spaces between said surfaces, the magnetic field bridging said pole member and the adjacent surface of said other member being of relatively high flux density and being isolated from the magnetic particle retaining side of said seal by at least one field of relatively low intensity bridging the space between other surfaces of said members and being isolated from the particle retaining side of said members by a second field of relatively low flux density.

11. A magnetic seal adapted to prevent the passage of magnetic particles between two relatively movable members including a non-magnetic housing carried by one of said members and having a plurality of surfaces thereon in spaced parallel relation with surfaces formed on said other member to define a labyrinth seal between said members, a pole member of magnetic material carried by said housing in spaced relation to one of said surfaces of said other member, and means for establishing magnetic fields bridging the spaces between said surfaces, the magnetic field bridging said pole member and the adjacent surface of said other member being of relatively high flux density and being isolated from the magnetic particle retaining side of said seal by at least one field of relatively low intensity bridging the space between other surfaces of said members.

12. A magnetic seal adapted to prevent the passage of magnetic particles between two relatively movable members including a non-magnetic housing carried by one of said members and having a plurality of surfaces thereon in spaced parallel relation with surfaces formed on said other member to define a labyrinth seal between said members, a pole member of magnetic material carried by said housing in spaced relation to one of said surfaces of said other member, and electromagnetic means associated with said pole member for establishing magnetic fields bridging the spaces between said surfaces, the magnetic field bridging said pole member and the adjacent surface of said other member being of relatively high flux density and isolated from the particle retaining side of said members and particle free sides of said members by fields of relatively low flux density bridging the spaces between said members.

13. A magnetic seal adapted to prevent the passage of magnetic particles between two relatively movable members including a non-magnetic housing carried by one of said members and having a plurality of surfaces thereon in spaced parallel relation with surfaces formed on said other member to define a labyrinth seal between said members, a pole member of magnetic material carried by said housing in spaced relation to one of said surfaces of said other member, and means including a permanent magnet for establishing magnetic fields bridging the spaces between said surfaces and said pole piece and the adjacent surface of said other member, the magnetic field bridging said pole piece and the adjacent surface of said other member being of higher flux density relative to the fields bridging the surfaces between said housing and said other member.

14. A magnetic particle coupling including a pair of relatively spaced rotatable members of magnetic material defining a magnetic gap therebetween, electromagnetic means for selectively establishing a magnetic field bridging the gap between the members to effect a torque transmitting bond between the magnetic members through a quantity of discrete magnetic particles interposed between the members, magnetic sealing means operatively interposed between said rotatable members to retain said magnetic particles between said members, said sealing means comprising a housing of non-magnetic material mounted on one of said members, said housing having a first annular surface thereon in spaced parallel relation to a first annular surface formed on said other member normal to the axis of rotation of said members, said housing having a second annular surface thereon in spaced parallel relation to a second annular surface formed on said other member in concentric relation to the axis of rotation of said members, said housing having an annular groove formed therein opening toward said second surface of said other member, an annular pole piece of magnetic material mounted in said groove, an annular field coil winding mounted in said groove adjacent the portion of said housing member defining said first surface, said field coil winding being electrically energizable independently of said electromagnetic means to establish a substantially toroidal magnetic field bridging the space between said first surfaces with relatively low flux density and bridging the space between said pole piece and the second surface of said other member with relatively high flux density, and means for selectively energizing said electromagnetic means and said field coil winding, said last-mentioned means including separate circuit control means for varying the energization of said electromagnetic means and of said field coil winding.

15. A magnetic particle coupling device including a pair of relatively spaced rotatable magnetic members defining an annular gap therebetween, means for establishing a controllable magnetic field bridging the gap between the members to effect a torque transmitting bond through discrete magnetic particles interposed between the members, and a magnetic seal effective to retain said particles between said members, said seal comprising a non-magnetic housing secured to one of said members, said housing and said member defining an annular groove opening axially of said coupling, said other member having a cylindrical portion formed thereon extending into said groove in spaced concentric relation to the side walls thereof and having a surface thereon normal to said cylindrical portion and in spaced parallel relation to a surface formed on said housing, said housing having an annular groove therein opening radially inwardly toward said cylindrical portion, an annular field coil winding and a pole piece of magnetic material mounted in said housing groove in side by side relation, said field coil winding being intermediate said pole piece and the portion of said housing in spaced parallel relation to the said surface on said other member, the flow of electrical current through said field coil winding being adapted to establish a substantially toroidal magnetic field bridging the space between said pole piece and said cylindrical portion with relatively high flux density and bridging the spaces between said surface portions and between said cylindrical portion and the cylindrical side wall of said first mentioned groove opposite said pole piece with relatively low flux density, and means for controlling the flow of a field-inducing electrical current through said field coil winding in inverse relation to the magnitude of the magnetic field bridging said gap.

References Cited in the file of this patent

UNITED STATES PATENTS

| | | |
|---|---|---|
| 2,557,140 | Razdowitz | June 19, 1951 |
| 2,713,927 | Rabinow | July 26, 1955 |
| 2,718,946 | Winther | Sept. 27, 1955 |
| 2,725,133 | Winther | Nov. 29, 1955 |
| 2,809,733 | Perry | Oct. 15, 1957 |

FOREIGN PATENTS

| | | |
|---|---|---|
| 680,233 | Great Britain | Oct. 1, 1952 |